US011627777B2

(12) United States Patent
Bailey et al.

(10) Patent No.: US 11,627,777 B2
(45) Date of Patent: Apr. 18, 2023

(54) SHOE SOLE WITH ENHANCED PERFORMANCE CHARACTERISTICS

(71) Applicant: INOVEIGHT LIMITED, Crook (GB)

(72) Inventors: Ian Bailey, Manchester (GB); Douglas Sheridan, Crook (GB); Aravind Vijayaraghavan, Manchester (GB); Maria Iliut, Manchester (GB)

(73) Assignee: INOVEIGHT LIMITED, Crook (GB)

( * ) Notice: Subject to any disclaimer, the term of this patent is extended or adjusted under 35 U.S.C. 154(b) by 332 days.

(21) Appl. No.: 16/763,473

(22) PCT Filed: Nov. 21, 2018

(86) PCT No.: PCT/GB2018/053370
§ 371 (c)(1),
(2) Date: May 12, 2020

(87) PCT Pub. No.: WO2019/102194
PCT Pub. Date: May 31, 2019

(65) Prior Publication Data
US 2020/0281308 A1   Sep. 10, 2020

(30) Foreign Application Priority Data

Nov. 24, 2017  (GB) .................................... 1719547

(51) Int. Cl.
*A43B 13/02*   (2022.01)
*C08K 3/04*    (2006.01)
(Continued)

(52) U.S. Cl.
CPC .......... *A43B 13/026* (2013.01); *A43B 13/023* (2013.01); *A43B 13/04* (2013.01);
(Continued)

(58) Field of Classification Search
CPC ..... A43B 13/026; A43B 13/023; A43B 13/04; A43B 13/22; C08K 3/042; C08L 7/00; C08L 23/0853; C08L 75/04
(Continued)

(56) References Cited

U.S. PATENT DOCUMENTS 7,745,528 B2 * 6/2010 Prud'Homme ........ B82Y 30/00
                                                524/495
2011/0108609 A1   5/2011 Woo et al.
(Continued)

FOREIGN PATENT DOCUMENTS

CN   103289044 A   9/2013
CN   104136237 A   11/2014
(Continued)

OTHER PUBLICATIONS

Naka, Yuri et al: "Shoes with wear resistance and flexural fatigue resistance," Dat Abase CA Chemical Abstracts Service, Columbus, Ohio, US; XP-002788497.
(Continued)

*Primary Examiner* — Ling Siu Choi
*Assistant Examiner* — Ronald Grinsted
(74) *Attorney, Agent, or Firm* — Workman Nydegger (57) ABSTRACT

The present invention provides a sole for a footwear article. The sole is formed from an elastomeric compound comprising at least one elastomer, and at least one graphene based material, in an amount ranging from 0.1 wt % to 5 wt % relative to the weight of said at least one elastomer, essentially uniformly distributed in said at least one elastomer.

5 Claims, 4 Drawing Sheets

(51) Int. Cl.
 *A43B 13/04* (2006.01)
 *A43B 13/22* (2006.01)
 *C08L 7/00* (2006.01)
 *C08L 23/08* (2006.01)
 *C08L 75/04* (2006.01)

(52) U.S. Cl.
 CPC .............. *A43B 13/22* (2013.01); *C08K 3/042* (2017.05); *C08L 7/00* (2013.01); *C08L 23/0853* (2013.01); *C08L 75/04* (2013.01)

(58) Field of Classification Search
 USPC ........................................................ 428/408
 See application file for complete search history.

(56) References Cited

U.S. PATENT DOCUMENTS

| | | |
|---|---|---|
| 2013/0150516 A1 | 6/2013 | Lettow |
| 2016/0021969 A1 | 1/2016 | Lettow, II et al. |
| 2020/0093216 A1 | 3/2020 | Lettow, II |

FOREIGN PATENT DOCUMENTS

| | | |
|---|---|---|
| CN | 104334628 A | 2/2015 |
| CN | 104725713 | 6/2015 |
| CN | 106279860 A | 1/2017 |
| CN | 106360877 A | 2/2017 |
| EP | 2921068 | 9/2015 |
| JP | 200546605 | 2/2005 |
| TW | 200930314 | 7/2009 |
| WO | 2016180306 | 11/2016 |

OTHER PUBLICATIONS

Yan, Fei, "EVA shoe sole materials and their preparation method," Dat Abase CA Chemical Abstracts Service, Columbus, Ohio, US; XP-002788496.

Yang, Yuchang, "ethylene-vinyl acetate copolymer or polyethylenebased foamed shoe soles", Database CA Chemical Abstracts Service, Columbus, Ohio, US; XP-002788495.

International Search Report and Written Opinion for PCT/GB2018/053370 dated Feb. 20, 2019.

Search Report for GB 1719547.0 dated May 16, 2018.

\* cited by examiner

SHOE SOLE WITH ENHANCED PERFORMANCE CHARACTERISTICS

CROSS-REFERENCE TO RELATED APPLICATIONS

The present application is a 35 U.S.C. § 371 U.S. National Stage of International Application No. PCT/GB2018/053370, filed on Nov. 21, 2018, which claims priority to Great Britain Patent Application No. 1719547.0, filed Nov. 24, 2017, the entire content of each of which is incorporated herein by reference.

The present invention generally relates to footwear and, in particular, to sole(s) (i.e. midsole, outer sole) for a footwear article, such as, for example, performance shoes. More specifically, the present invention relates to shoe sole(s) comprising a graphene-based elastomer compound adapted to provide improvements in sole specific material characteristics.

INTRODUCTION

These days, shoes have become a high-tech product that is designed for general, as well as, highly specific use. In particular, performance footwear, such as, for example, mountaineering boots, hiking or trail running shoes, road running shoes, track & field shoes or climbing shoes, is purposefully designed, including materials that are optimised to provide the best performance for a specific activity. Efforts to improve shoes have therefore centred on decreasing shoe weight, improve cushioning, flexibility and stability, as well as, durability and wear resistance. In addition, shoe soles in particular, are desired to provide good grip, good shock dispersion capabilities and a good energy return.

Thus, when designing a modern performance shoe, every part of the shoe has to be optimised towards the intended use and application. Thus, the upper may be particularly flexible, light and waterproof, or the toe box may be adapted to provide protection from rough terrain. The heel support may be particularly stiff to provide support to the ankle, wherein the fastening mechanism may be sufficiently adjustable to allow various settings. Undoubtedly, the shoe sole (i.e. midsole, outer sole) is one of the most important components of the shoe, as it provides the functional interface between the foot of the user and the ground surface. Thus, if the shoe sole is not optimised (or at least adaptable) for a specific ground surface, terrain or use (e.g. tarmac, gravel, trail, mud, grass, rock etc.), the user may not be able to utilise his full potential.

Further, the sole (outsole in particular) is usually subjected to severe static and dynamic deformation during use, e.g. compression, stretching and friction with ground surface, which is why the wear resistance (e.g. abrasion resistance) is an important parameter that can characterises the longevity and durability of a shoe. However, a good wear resistance usually comes at a price, which is to compromise "grip" (elongation ability of the material). For example, so called "sticky" soles, i.e. soles that have a very good grip on rock or road surfaces, are made of relatively soft and flexible compound material that has a low wear resistance (i.e. tear strength, tensile strength), so a "sticky" sole usually does not last very long. On the other hand, soles with a comparatively high wear resistance (abrasion resistance) are usually relatively stiff and less "sticky".

Shoe soles typically have two main components, the midsole and the outsole. The midsole contributes to foot stability and is the primary shock absorption member of the sole. Thus, the midsole is generally composed of softer and more flexible material (e.g. Polyurethane—PU, Thermoplastic Polyurethane—TPU, Ethylene-vinyl acetate—EVA) than the outsole. Consequently, midsole material is not very wear resistant. The outsole is the ground contacting portion of the sole and provides traction, as well as, protection to the midsole. Accordingly, outsoles are made from durable materials such as rubber. However, outsoles add considerable weight to the overall shoe.

Accordingly, it is an object of the present invention to provide an improved shoe sole material that is adapted to provide both, a good grip (i.e. relatively high elongation, such as provided by "sticky" rubber) and a good wear resistance (e.g. less than DIN160 abrasion), but which is also light-weight (relative to shoe soles with equivalent material characteristics).

SUMMARY OF THE INVENTION

Preferred embodiment(s) of the invention seek to overcome one or more of the disadvantages of the prior art.

According to a first embodiment of the invention, there is provided a sole for a footwear article, said sole is formed from an elastomeric compound comprising:

at least one elastomer, and at least one graphene based material, in an amount ranging from 0.1 wt % to 5 wt % relative to the weight of said at least one elastomer, essentially uniformly distributed in said at least one elastomer.

This provides the advantage of an elastomer compound material that has elongation properties suitable to provide a sufficiently "sticky" sole (when compared to equivalent sole material known in the art), but which also has an abrasion resistance that is sufficiently low to feasibly use the material as an outer sole. Thus, the elastomer compound of the present invention provides an enhanced grip and durability, and the shoe sole may only require one component (e.g. midsole), therefore, saving considerable weight when compared to equivalent shoe soles comprising a midsole and outsole.

Advantageously, said at least one graphene based material may range from 0.1 wt % to 1.0 wt %. Preferably, said at least one graphene based material may range from 0.1 wt % to 0.5 wt %.

Advantageously, said graphene based material may comprise any one or any combination of single-layer graphene sheets and/or multi-layer graphene sheets and/or single-layer graphene oxide sheets and/or multi-layer graphene oxide sheets. Preferably, said multi-layer graphene sheets and said graphene oxide sheets may comprise between 1 and 10 layers of graphene. In particular, said multi-layer graphene sheets and said graphene oxide sheets may comprise between 1 and 5 layers of graphene.

Advantageously, said single-layer graphene sheets, said multi-layer graphene sheets and said graphene oxide sheets may have a mean lateral particle size of at least 1 μm with a standard deviation in the region of 2 μm.

Preferably, said at least one graphene-based material may be of a planar or two-dimensional form.

Advantageously, said at least one elastomer may be any one of Polyurethane (PU), Thermoplastic Polyurethane (TPU) Ethylene-vinyl acetate (EVA), Polyisoprene (synthetic rubber) and natural rubber.

Advantageously, when said elastomer is Polyisoprene (synthetic rubber) or natural rubber, said elastomeric compound may have one or more of the following material characteristics:

an abrasion resistance of 160 $mm^3$;

a tensile strength of 10 MPa;
an elongation of 600%, and
a tear strength of 40 KN/m.

Preferably, when said elastomer is Polyisoprene (synthetic rubber) or natural rubber, said elastomeric compound may have all of the following material characteristics:
an abrasion resistance of 160 mm$^3$;
a tensile strength of 10 MPa;
an elongation of 600%, and
a tear strength of 40 KN/m.

Advantageously, when said elastomer is Ethyl-Vinyl Acetate (EVA), said elastomeric compound may have one or more of the following material characteristics:
an abrasion resistance of 430 mm$^3$;
a tensile strength of 3.5 MPa;
an elongation of 405%, and
a tear strength of 22 KN/m.

Advantageously, said graphene based material may be provided from any one of nano-graphite, fullerenes, carbon nano-horns, carbon nano-fibers, and mixtures thereof, graphene oxide, reduced graphene oxide, fluorographene or fluorinated graphene or hydrogenated graphene, and other chemical modifications of graphene that contain any one or any combination of carboxyl-, carbonyl-, epoxide-, hydroxyl-, amino-, amido-, imino-, oximo-, ether-, ester-, guanidine-, hydroxylamine compound.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

Figure 5:
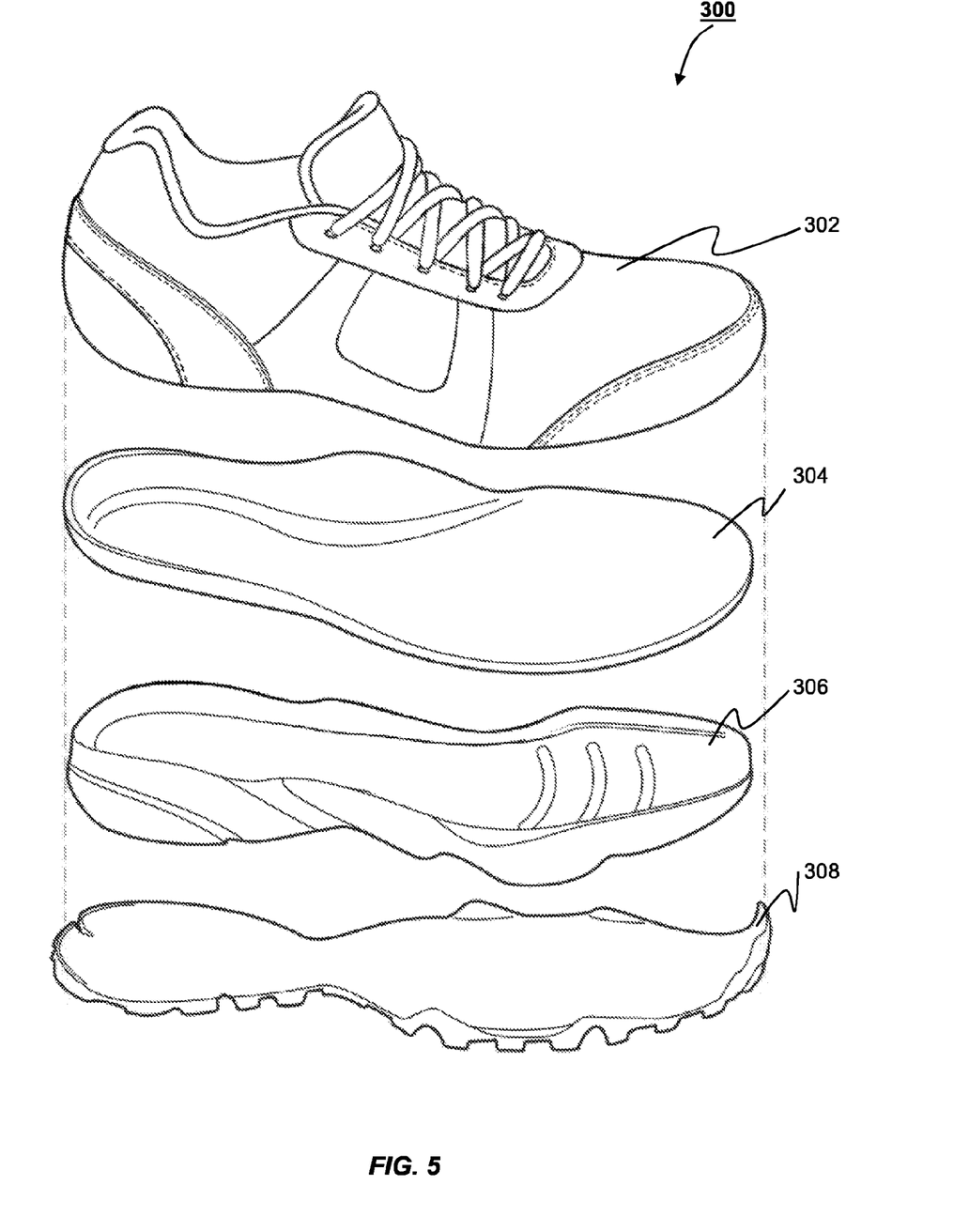
FIG. 5 shows an exploded view of an example footwear comprising the upper, insole, midsole and outsole, wherein the midsole and/or outsole are made from the elastomer compound material of the present invention.

The exemplary embodiments of this invention will be described in relation to the footwear and in particular to soles for footwear 300. However, it should be appreciated that the elastomer compound material of the present invention may be used for any other component of footwear.

Referring to FIGS. 1 to 5, the present invention is a shoe sole 306, 308 (i.e. outsole 308 and/or midsole 306) made from a graphene-based compound material 100. The compound material 100 comprises a mixture of at least one elastomer 102 and a graphene based material 104. In one embodiment, the amount of graphene-based material 104 dispersed into the at least one elastomer 102 is less than five weight percent 5 wt %, i.e. percentage by weight relative to the at least one elastomer 102). In a preferred embodiment, the amount of graphene-based material 104 is less than one weight percent 1 wt %). Keeping the graphene content in the relatively low ranges between 0.1 wt % and 0.5 wt %, 1.0 wt % or 5 wt % can provide a number of advantages. Apart from reducing the overall manufacturing costs of the material, optimising the percentage of graphene to the base material also optimises the amount of water required for dispersion, as an increased amount of water may be detrimental to the intended material properties. In addition, too much graphene in the mixture may also reduce the elongation properties of the material (i.e. reduction of elongation with increasing graphene percentage).

Figure 4:
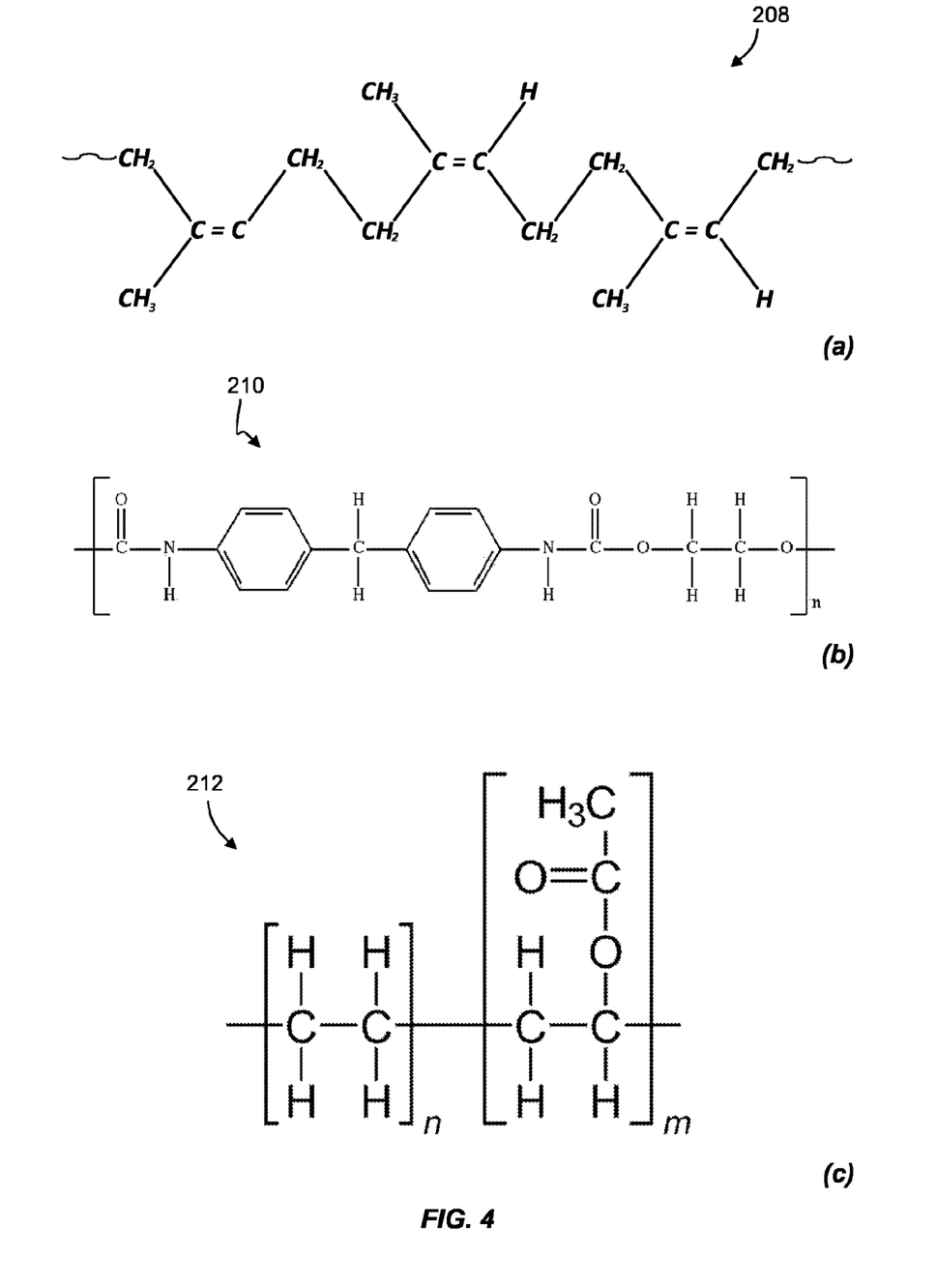
FIG. 4 shows the chemical structure of (a) rubber, (b) Polyurethane (PU) and (c) ethylene-vinyl acetate.

The at least one elastomer 102 may be any one or any combination of a rubber 208 (natural or synthetic rubber), Polyurethane (PU) 210, Thermoplastic Polyurethane (TPU) and Ethylene-vinyl acetate (EVA) 212.

Figure 3:
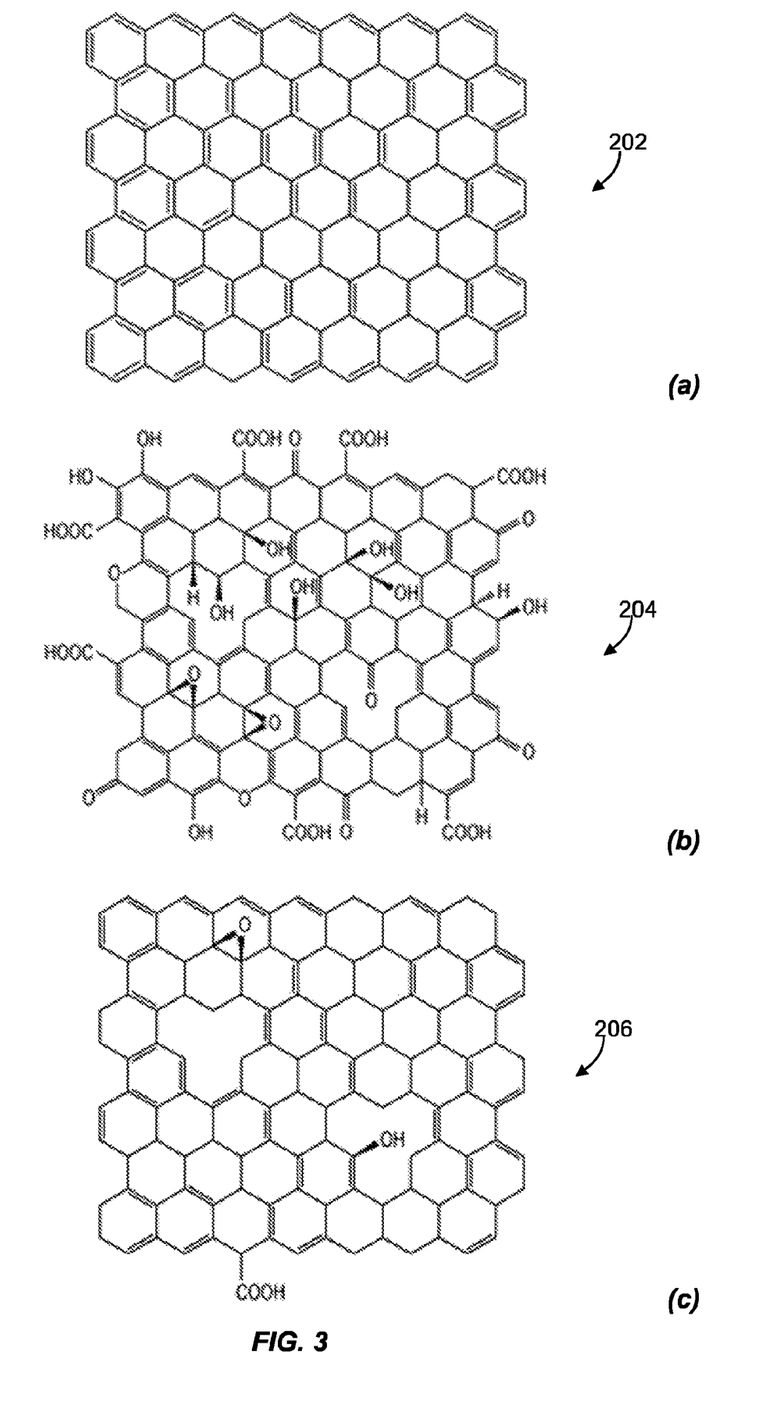
FIG. 3 shows the chemical structure of (a) graphene (b) graphene oxide and (c) reduced graphene oxide.

The graphene-based material 104 may be any one or any combination of graphene (single-layer, multi-layer) 202, graphene oxide 204 and reduced graphene oxide 206, though, it is understood that no distinction is made between reduced Graphene Oxide (rGO) and Graphene, as reduced Graphene Oxide can be considered similar to Graphene. rGO comprises thinner flakes and is currently more expensive, but a smaller amount of rGO is required to provide the same improvements as with graphene. Graphene 104, as used herein, may comprise at least one single-atom thick sheet of sp$^2$-hybridized carbon atoms bonded to each other to form the typical honey-comb lattice. However, the graphene material 104 can include single-layer graphene sheets, a few layer thick graphene sheets (i.e. between 2 and 5 layers) and/or graphene aggregates. Reduced graphene oxides may refer to the product of reducing graphene oxides or graphite oxides. Graphene oxides and graphite oxides can be reduced by various methods known in the art, e.g. chemically, thermally etc.

Figure 1:
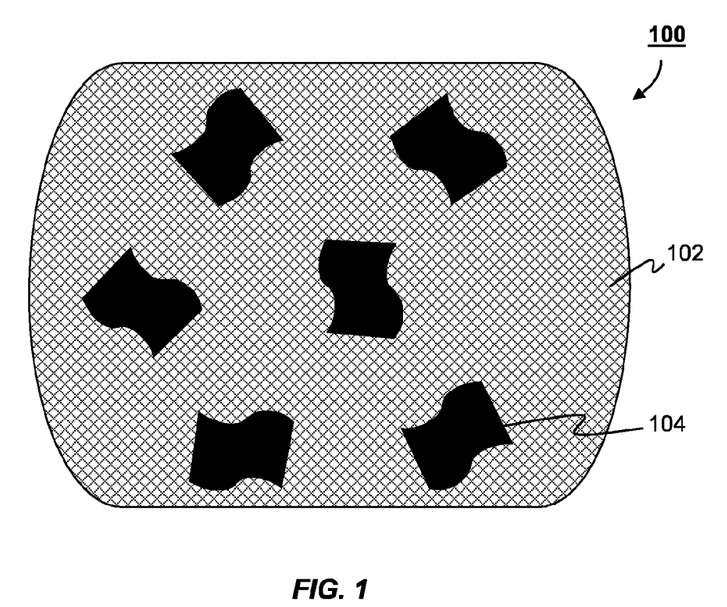
FIG. 1 is a simplified schematic illustration of a rubber-graphene composite material of the present invention, showing graphene sheets (not true to scale) incorporated into the rubber.
Figure 2:
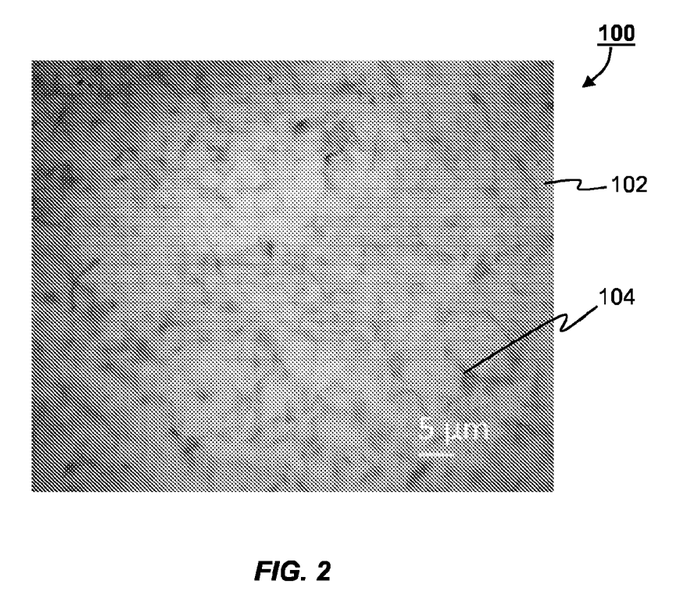
FIG. 2 shows a real microscopic image of an example rubber-graphene composite.

The dimensions of the graphene material 104 (graphene, graphene oxide) are typically defined by thickness and lateral domain size, wherein the thickness generally depends on the number of layered graphene sheets. In a preferred embodiment, the graphene material 104 may be provided as single-layer and/or multi-layer sheets (e.g. less than 5 layers, or between 0.32 nm and 1 nm thick) with a lateral dimension (particle size) in the region of one micrometre (i.e. 1 μm). However, the preferred lateral dimension of 1 μm is understood as a mean value having a standard deviation of around 2 μm (a distribution). That means that graphene material particles may range from less than 0.5 μm up to 10 μm (with an intended mean value of about 1 μm).

The graphene-based compound material 100 of the present invention may further comprise additives (e.g. stabilising agents) if used with single or multi-layer graphene 104.

Other graphene material may also be provided in the form of fullerenes, however, the preferred embodiment utilises planar/2D graphene materials, such as, graphene, graphene oxide, reduced graphene oxide and other 2D graphene-based materials.

In one preferred embodiment, the graphene-based compound material 100 of the present invention includes a homogeneous mixture (e.g. blend) of rubber and 0.1 wt % of graphene material 104 (i.e. single/multi-layer graphene and/or graphene oxide), and the compound material exhibits the following properties:
(i) an abrasion resistance of 160 mm$^3$;
(ii) a tensile strength of 10 MPa;
(iii) an elongation of 600%, and
(iv) a tear strength of 40 KN/m.

It is to be understood that the specific ranges of graphene wt % (i.e. 0.1 to 5, 0.1 to 1, 0.1 to 1, or even 0.1 to 0.2) are essential to provide the simultaneous improvements to different material properties (i.e. UTS, elongation, abrasion resistance etc.). Thus, the described ranges provide an optimised amount of graphene to achieve the desired material properties of the sole material. Outside the proposed ranges, not all of the material properties will improve (optimise) towards the desired values.

In other embodiments, the graphene-based compound material 100 of the present invention may include a homogeneous mixture of Polyurethane (PU) and 0.1 wt % graphene material 104, or a homogeneous mixture of Thermoplastic Polyurethane (TPU) and 0.1 wt % graphene material 104, or a homogeneous mixture of Ethylene-vinyl acetate (EVA) and 0.1 wt % graphene material 104. Each one of the other graphene-based compound materials exhibits an increased elongation, as well as, a considerably improved abrasion resistance (e.g. DIN).

(i) Example of Manufacturing Method of a Midsole 306 (EVA):

A homogeneous mixture of the elastomer compound material 100 can be achieved by various methods known in the art, which are not discussed in any more detail.

Typically, the graphene material 104 is provided in liquid (solution) or powdered form, but may also be supplied as a high-concentration gel, ready to be added into the elastomer 102.

In this particular example, a predetermined amount of graphene material 104 (i.e. equivalent to 0.1 wt %) is mixed with the elastomer 102 (e.g. EVA) and may also include other filler material (optional). The resulting mixture is then rolled and pressed through various steps, before it is pushed through a screen and formed into pellets (ca. 5 mm in diameter).

The pellets are then poured into a series of cavities (moulds) of predetermined size (ca. 8 cm long) before the moulds are closed and the pellets are melted for about 8 min. When opening the moulds, the compound (also known as "bun") "jumps" out of the cavity expanding to about 200% of the cavity size. The bun is then "stuffed" into another mould, which is closed and heated under pressure (ca. 8 min) to produce the end product (e.g. midsole 306).

It is understood by the person skilled in the art, that a similar method may be used for manufacturing outsoles (i.e. using a rubber compound as base elastomer) or midsoles 306 based on PU or TPU. The rubber compound may include a blend of natural and synthetic rubber.

(ii) Example Test Batch—Rubber (e.g. for Outsole 308):

A small batch of the graphene based compound material 100 was produced to assess the effectiveness in dispersion, as well as, providing a base line on, whether or not, there was any noticeable change in the mechanical properties. Two different elastomers 102, i.e. having a DIN 150 and a DIN 180 (high stick) abrasion resistance, were tested without adding the graphene material 104, so as to build initial performance aspects of these base elastomers 102. All mixtures utilized carbon black

TABLE 1

| | DIN 150 material | | | DIN 180 material | | |
|---|---|---|---|---|---|---|
| Hardness | | 62 | Hardness | | | 58 |
| Density | g/cm$^2$ | 1.12 | Density | g/cm$^2$ | | 1.12 |
| Tensile Strength | MPa | 9 | Tensile Strength | MPa | | 10.6 |
| Elongation | % | 400 | Elongation | % | | 600 |
| Tear Strength | KN/m | 39 | Tear Strength | KN/m | | 48 |
| DIN abrasion | mm$^3$ | 145 | DIN abrasion | mm$^3$ | | 180 |

The values presented in Table 1 present the established baseline values for the DIN 150 rubber and the DIN 180 rubber.

For the DIN 150 rubber, a mixture of 5 Kg (kilogram) rubber with 5 g (gram) graphene material was prepared. This was done with a premix of graphene material 104, including additives such as sulphur during the roller blending of the compound 100. This blending was continued for ca. 10 minutes and then processed through rollers (i.e. thinned and stretched). The changes in material properties are shown in Table 2.

TABLE 2

| DIN 150 graphene compound (5 kg rubber + 5 g graphene material) | | | DIN 180 graphene compound (59 kg rubber + 59 g graphene material) | | |
|---|---|---|---|---|---|
| Hardness | | 62 | Hardness | | 58 |
| Density | g/cm$^2$ | 1.12 | Density | g/cm$^2$ | 1.13 |
| Tensile Strength | MPa | 11.6 | Tensile Strength | MPa | 12 |
| Elongation | % | 600* | Elongation | % | 650* |
| Tear Strength | KN/m | 41.8 | Tear Strength | KN/m | 50 |
| DIN abrasion | mm$^3$ | 110* | DIN abrasion | mm$^3$ | 150 |

Both rubber-graphene compounds (DIN 150, DIN 180) showed improvements in elongation and abrasion resistance (DIN). For example, DIN 150 rubber elongation improved from 400% to 600%, wherein the abrasion resistance improved from DIN 145 to DIN 110, i.e. showing a uniqueness of having a "sticky" rubber with nearly road running specification (typical values for road running shoes) for abrasion resistance (DIN 100-105).

The DIN 180 rubber compound 100 also shows significant improvements in elongation and abrasion resistance. The DIN 180 rubber batch included 58.96 Kg of rubber 102 with 59 g graphene material 104. Here, the graphene material 104 was provided into the mixture along with the silica stage and added after initial blending of the various rubbers used in the compound, e.g. in a Banbury mix machine. In particular, the rubber (natural, natural white, BR 01—synthetic rubber) is added into the mixer, ground-up and mixed (10 min) at a temperature starting at 35 degrees Centigrade (° C.). The blended rubber is then pushed out and rolled through large scale rollers, where it is mixed and pressed for ten minutes, ensuring total blending of the natural and synthetic rubbers. At this stage, the rubber temperature is around 50° C., wherein the temperature increase is caused by the mixing and pressing.

The rubber mixture is then introduced back into the mixing machine at which point the remaining chemicals, fillers and powders (i.e. graphene material) are added. The mixture is then heated in a closed chamber from about 37° C. to 110° C. After thoroughly mixing for about 12 minutes, the mixture is pushed out for further processing.

When using "sticky" rubber, temperature and timing are crucial, as the mixture needs to be at a temperature of 110° C. for a predetermined maximum time. If the mixture stays too hot for too long, it gets too "sticky". The mixture is then put through big rollers for total blending for about 10 minutes, and is then rolled through a water bath to cool the rubber. After that, the rolled mixture is cut into sheets, for example, about 61 cm (centimetre) long and 36 cm wide.

Alternatively, the graphene material 104 may be added at a later stage, i.e. in the manufacturing process.

When used for an outsole 308, lowering of the DIN abrasion resistance from DIN 180 to 150 makes for a very good abrasion resistance while providing a "sticky" compound.

In addition, a slip resistance test (ASTM F609-05) was performed with the DIN 150 compound material to provide a baseline when comparing the elastomer to the graphene-based compound material 100. The results of the baseline slip test can be see in Table 3.

TABLE 3

| | DIN 150 material | | |
|---|---|---|---|
| ASTM F609-05 | Static (Front) | Dry | 1.22 |
| | | Wet | 0.85 |
| | Dynamic (Heel) | Dry | 1.13 |
| | | Wet | 0.81 |

In summary, the touch of the graphene-based compound material 100 felt stronger to the pull and yet was still sticky.

(iii) Example Test Batch—EVA (e.g. for Midsole 306):

The most popular, current midsole materials being utilized in athletic shoes are PU, TPU and EVA. The intention of these materials is to provide a foot cushioning system as well as energy return to the user during activity.

Midsoles 306 are judged upon similar measures to outsoles 308 in areas like tear strength, elongation, tensile strength and, as they are often exposed, DIN abrasion resistance. Additional demands, such a compression set resistance and resiliency (energy return) are characteristics specific to midsole components.

The following materials are generally used for midsoles 306. Polyurethane (PU), which is a quick foaming formulation that is usually processed at high temperatures and through an injection nozzle. Thermoplastic Polyurethane (TPU), which is a slow foaming cushioning material, done with heat transfer management. TPU uses a foaming formulation to establish durometers. Ethylene-vinyl acetate (EVA), which is a base product combined with a foaming agent and processed, for example, through compressing it into a desired shape (i.e. compression molded) or through expansion (injection molded).

When adding graphene material in accordance with the present invention, the base structure of the formulation is changed, subsequently changing the characteristic properties of the material.

For example, the tear strength (ability to resist tearing once the surface has been abraded or cut under usage) of the graphene-based midsole compound may improve from about 18.0 KN/m (Kilo-Newton per meter) to 19.5 KN/m for TPU/PU to a level of 21.5 KN/m to 22.5 KN/m, wherein the tensile strength of EVA may change from 17 KN/m to 20 KN/m.

A relatively high tensile strength (i.e. the ability to resist breakage under load) is important in the midsole 306, as it allows the midsole 306 to endure greater stresses during use. In particular shoes used for trail running, benefit greatly from a high tear and tensile strength.

In this example test, the tensile strength of PU is about 5.4 N/mm$^2$, for EVA and TPU, the tensile strength is around 2.6 to 3.0 N/mm$^2$. When adding graphene material 104, an improvement of about 1.5 to 2.0 N/mm$^2$ has been shown (see tables 4, 5 and 6).

Furthermore, EVA has a relatively low DIN abrasion resistance of about 500 to 510 mm$^3$, which has been improved to about 450 mm$^3$ when adding graphene material 104 in accordance with the present invention.

When using PU/TPU, the DIN abrasion resistance may improve from a mean standard of 390 mm$^3$ to about 340 mm$^3$ or 350 mm$^3$, which shows a significant improvement through the introduction of graphene material 104. Thus, a graphene-based midsole material may be used in low impact wear areas of the shoe.

Furthermore, the resiliency of the midsole 306 is another crucial performance parameter, as it indicates the energy return of a midsole 306 after the force/load ceases, i.e. it is the ability of the material to absorb energy (from the impact) and release the energy during push-off to the wearer. Resiliency may be dependent on the tensile strength of the midsole 306.

Typical ratings for TPU are about 60%, which may improve to about 70% with added graphene material 104. Such an improvement would represent a significant energy return that may provide a noticeable improvement to the user performance. Typical ratings for EVA are in the range of 55% and may increase to a resiliency of about 60%-62% to potentially 70%.

Another characteristic parameter of the midsole 306 is the avoidance of compression set, as continued usage of running shoes 300 may result in a "deadening" of the cushioning ability of the midsole's foam material. Thus, the compression set is a characterizing parameter for the lifecycle of the shoe. Typically, a compression set is measured by compressing a specimen (e.g. 0.50 inch thick, ca. 1.27 cm) to 50% for 22 hours (sometimes 24 hours) at 70° C., release the load for another 24 hours and then measure the thickness of the specimen.

The improvement of the compression set (i.e. the ability to take a load and not loose its shape), when using graphene material 104 in accordance with the present invention, is in the region of 5% for the various midsole materials (e.g. PU, EVA, TPU). For example, a TPU based graphene compound will see at least 6-10% improvement, i.e. from 45%-47% to about 37%. This improvement is due to the usage of foaming agents, which are strengthened by the addition of the graphene material 104. The compression set resistance of EVA may improve from about 36% to about 31% when adding graphene material 104.

Other tests have shown a compression set improvement to about 20% for EVA with added graphene (compared to the typical 40% to 50% for regular EVA).

Achievable changes in material properties, when using graphene material with TPU in accordance with the invention, are shown in Table 4.

TABLE 4

| TPU | | | TPU + graphene material | | |
|---|---|---|---|---|---|
| Resiliency | % | 57 | Resiliency | % | 78-85 |
| Tensile Strength | MPa | 2.9 | Tensile Strength | MPa | 4 |
| Elongation | % | 375 | Elongation | % | 405 |
| Tear Strength | KN/m | 18 | Tear Strength | KN/m | 24 |
| DIN abrasion | mm$^3$ | 391 | DIN abrasion | mm$^3$ | 270 |

Achievable changes in material properties when using graphene material with EVA in accordance with the invention are shown in Table 5.

TABLE 5

| EVA | | | EVA + graphene material | | |
|---|---|---|---|---|---|
| Resiliency | % | 55 | Resiliency | % | 70 |
| Tensile Strength | MPa | 2.6 | Tensile Strength | MPa | 3.5 |

TABLE 5-continued

| | EVA | | EVA + graphene material | | |
|---|---|---|---|---|---|
| Elongation | % | 370 | Elongation | % | 405 |
| Tear Strength | KN/m | 17 | Tear Strength | KN/m | 22 |
| DIN abrasion | mm$^3$ | 512 | DIN abrasion | mm$^3$ | 430 |

Further tests using regular EVA and EVA with added graphene may suggest improvements in the midsole abrasion resistance (e.g. from DIN 220-250 for regular EVA to about DIN 150 for EVA with added graphene).

Achievable changes in material properties when using graphene material with PU in accordance with the invention are shown in Table 6.

TABLE 6

| | PU | | PU + graphene material | | |
|---|---|---|---|---|---|
| Resiliency | % | 25 | Resiliency | % | 45 |
| Tensile Strength | MPa | 5.4 | Tensile Strength | MPa | 7 |
| Elongation | % | 350 | Elongation | % | 380 |
| Tear Strength | KN/m | 19.5 | Tear Strength | KN/m | 25 |
| DIN abrasion | mm$^3$ | 390 | DIN abrasion | mm$^3$ | 320 |

It will be appreciated by persons skilled in the art that the above embodiment(s) have been described by way of example only and not in any limitative sense, and that various alterations and modifications are possible without departing from the scope of the invention as defined by the appended claims.

The invention claimed is:

1. A sole for a footwear article, said sole is formed from an elastomeric compound comprising:
a natural rubber or a rubber compound containing natural rubber, and
at least one graphene-based material, in an amount ranging from 0.1 wt % to 1 wt % relative to the weight of said natural rubber or said rubber compound containing said natural rubber, essentially uniformly distributed in said natural rubber or said rubber compound containing said natural rubber, wherein said graphene based material comprises any one or any combination of single-layer graphene sheets and/or multi-layer graphene sheets and/or single-layer graphene oxide sheets and/or multi-layer graphene oxide sheets, and wherein said single-layer graphene sheets, said multi-layer graphene sheets, said single-layer graphene oxide sheets and said multi-layer graphene oxide sheets have a mean lateral particle size of 1 μm with a standard deviation in the region of 2 μm.

2. A sole according to claim 1, wherein said at least one graphene-based material ranges from 0.1 wt % to 0.5 wt %.

3. A sole according to claim 1, wherein said multi-layer graphene sheets and said graphene oxide sheets comprise between 1 and 5 layers of graphene.

4. A sole according to claim 1, wherein said at least one graphene-based material is of a planar or two-dimensional form.

5. A sole according to claim 1, wherein said graphene-based material is provided from any one of nano-graphite, graphene oxide, reduced graphene oxide, fluorographene or fluorinated graphene or hydrogenated graphene, and other chemical modifications of graphene that contain any one or any combination of carboxyl-, carbonyl-, epoxide-, hydroxyl-, amino-, amido-, imino-, oximo-, ether-, ester-, guanidine-, hydroxylamine compound.

* * * * *